United States Patent
Mastie et al.

(10) Patent No.: US 6,498,656 B1
(45) Date of Patent: Dec. 24, 2002

(54) RULE BASED SELECTION CRITERIA FOR CONTROLLING PRINT JOB DISTRIBUTION

(75) Inventors: Scott David Mastie, Longmont, CO (US); Ming Xie, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/140,613

(22) Filed: Aug. 26, 1998

(51) Int. Cl.[7] .......................... G06F 13/00; G06F 3/12; G06F 15/02
(52) U.S. Cl. ..................... 358/1.15; 358/1.13; 358/1.9
(58) Field of Search .............................. 358/1.15, 1.16, 358/1.9, 1.13

(56) References Cited

U.S. PATENT DOCUMENTS

| | | | | |
|---|---|---|---|---|
| 5,467,434 A | * | 11/1995 | Hower, Jr. et al. | 395/114 |
| 5,870,089 A | * | 2/1999 | Fabbio et al. | 345/335 |
| 6,088,120 A | * | 7/2000 | Shibusawa et al. | 358/1.15 |

* cited by examiner

Primary Examiner—Joseph Mancuso
Assistant Examiner—Douglas Tran
(74) Attorney, Agent, or Firm—David W. Victor; Konrad Raynes Victor & Mann LLP (57) ABSTRACT

Disclosed is a system for routing print jobs to one of a plurality of printers or print queues, such as a logical print queue. After providing a print job, a set of printers capable of printing the print job is determined. The set of printers is queried to determine status information thereon. A criterion is then applied to the status information for the set of printers to determine a subset of printers. The determined subset is dependent upon the determined status information. A printer is selected from the subset and the print job is routed to the selected printer.

27 Claims, 3 Drawing Sheets

RULE BASED SELECTION CRITERIA FOR CONTROLLING PRINT JOB DISTRIBUTION

CROSS-REFERENCE TO RELATED APPLICATIONS

This application is related to the following co-pending and commonly-assigned patent applications, all of which are filed on the same date herewith, and all of which are incorporated herein by reference in their entirety:

"Load Balancing For Processing A Queue Of Print Jobs," Scott D. Mastie Hongliang Tong, Min Xie, Christopher B. Hirsch, having U.S. application Ser. No. 09/140,480;

"Selecting Printing Attribute Values in a Network Printing System," by Scott D. Mastie and Arthur R. Roberts, having U.S. application Ser. No. 09/143,281; and "Multiple Insertion Point Queue to Order and Select Tasks to be Processed," by Scott D. Mastie and Ming Xie, having U.S. Pat. No. 5,145,001.

BACKGROUND OF THE INVENTION

1. Field of the Invention

The present invention relates to a method and system for applying rule based criteria to select a printer from a list of candidate printers and, in particular, to select a logical printer associated with a queue that routes print jobs to a printer.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job. To route print jobs through a network printing system, International Business Machines Corporation (IBM) provides Printing Systems Manager (PSM) products that provide centralized and distributed management of a network printing system. The IBM PSM systems manage the flow of print jobs and insure that a print job is routed to a printer that can handle the job.

A print job is comprised of one or more electronically-stored files and the print attributes therefor. The print attributes inform the printer how to process the files. To assemble print jobs, previous systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by the user or systems operator.

Job tickets typically only define the print attributes for a single file. However, a document may be comprised of multiple files, each having one or more print attributes. A file submitted to the printer often includes printer instructions in a page description language (PDL) such as POSTSCRIPT™. POSTSCRIPT is a trademark of Adobe Systems, Incorporated. The PostScript language is used by many printers and applications to provide the complex fonts, graphics, and image handling capabilities required by today's applications. The PostScript language must be interpreted by a transform process in the printer or elsewhere in the network to produce a printed image file that is ready to be printed. Print image files are in a bit-mapped image format, also known as a raster image. A raster image processor (RIP) translates PDL files to a raster image or RIP version of the file. In the desktop publishing environment, it can take several hours to transform a large PDL print file to its RIP version.

The IBM AIX® PRINT SERVICES FACILITY™/6000 (PSF/6000) software system transforms PostScript files into an Advanced Function Presentation data stream (AFP data stream) for printing on printers attached to a machine implementing the PSF/6000 software. AIX is a registered trademark of IBM and PRINT SERVICES FACILITY is a trademark of IBM. The PSF/6000 software uses the PS2AFP transform command to transform PostScript and other file formats into an AFP data stream file without submitting it immediately to the printer. The PS2AFP command runs as a daemon, which is a program that runs unattended in the background of the operating system. Daemon processes generally provide services that must be available at all times. A daemon runs continuously, looking for work to do, performing that work, and waiting for more work.

In previous systems, including those that implement the ISO DPA 10175, POSIX 1387.4 and PSIS printing standards, such as the IBM Printer Resource Manager products, print jobs are received and queued at a single point before being routed to a logical printer or printer that can handle the print job. Such a single point queue is sometimes referred to as a "spooler." Spoolers are servers that accept requests from many clients, validate job and document attributes with those of the intended print destination, provide queuing and scheduling, and then route jobs/documents to the appropriate printer. A queued print job is then transferred to a logical printer, which then routes the print job to a queue for one or more physical printers.

Current techniques for routing print jobs to logical printers are often based on the first available logical printer. Such techniques do not efficiently route print jobs to optimize throughput as factors that can effectively optimize throughput are not considered with such techniques.

SUMMARY OF THE PREFERRED EMBODIMENTS

To overcome the limitations in the prior art described above, preferred embodiments disclose a method and system for routing print jobs to one of a plurality of printers. After providing a print job, a set of printers capable of printing the print job is determined. The set of printers is queried to determine status information thereon. A criterion is then applied to the status information for the set of printers to determine a subset of printers. The determined subset is dependent upon the determined status information. A printer is selected from the subset and the print job is routed to the selected printer.

In further embodiments, printers are organized according to print queues, wherein each print queue routes print jobs to at least one associated printer. In such case, the print queues are processed and the criterion are applied to the queues to determine a subset of print queues. The print job is then routed to a print queue, which then routes the print job to a printer associated with the print queue.

In further embodiments a second criteria may be applied to the subset determined from the first criteria to obtain a second subset from which the print queue is selected.

In further embodiments, criteria can be encoded as rules in a rule-based system to allow for modification of the type and order of the rule criteria.

In further embodiments, the queue may contain pointers to the content of the print job or tokens representing the print job to avoid transferring the content of the print job when queuing and transferring the print job throughout the system. In this way, only the pointer or token for a print job is queued and routed through the system. The actual content of the print job is routed to the printer selected to print the job.

In still further embodiments, the first and second criteria may involve a queue depth rule and a reuse rule to optimize load balancing and minimize network traffic, respectively.

Current techniques often do not consider the load balancing of print jobs across logical printer queues and, thus, tend to over or under utilize printer resources in the system. Moreover, current techniques often do not consider reuse capabilities and the number of component print jobs that are already on the machine including the logical printer queue. Still further, in the prior art, routing occurs after the print job is queued. Routing print jobs to queues without consideration of reusability at the machine including the queue increases network traffic because the components of the print job that reside on separate machines must be routed to the machine including the selected logical printer queue.

Preferred embodiments provide a method and system for selecting a printer queue, such as a logical printer queue, based on criteria that optimize a desired goal.

For instance, if the first criteria is based on selecting a logical printer queue of minimum depth, then the rule based criteria optimizes load balancing by insuring that queues are not over or under utilized. If the first criteria is based on a reuse factor, then network traffic is minimized because logical printer queues are selected that are implemented in machines that already maintain copies of the print job. In this way, a systems operator or user may select different rule-based criteria to control how print jobs are distributed to different printers or to queues associated with logical printers.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural and operational changes may be made without departing from the scope of the present invention.

Hardware and Software Environment

Figure 1:
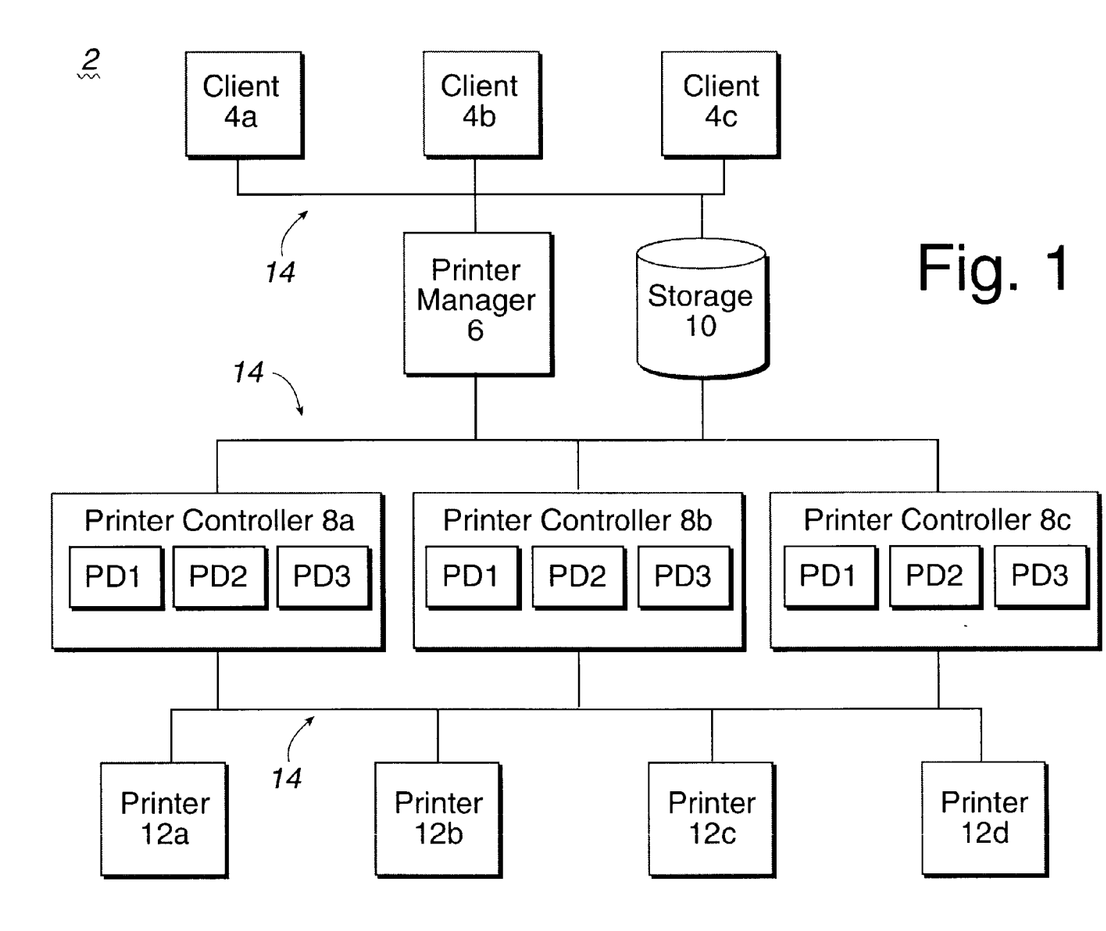
FIG. 1 is a block diagram illustrating a software and hardware environment in which preferred embodiments of the present invention are implemented.

FIG. 1 illustrates a preferred hardware and software environment in which preferred embodiments of the present invention are implemented. A network printing system 2 is comprised of a plurality of client computers 4a, b, c connected to a printer manager 6, which routes print jobs received from the clients 4a, b, c to one of a plurality of printer controllers 8a, b, c. The clients 4a, b, c and the printer manager 6 may access a storage device 10 which may store various printer related files. The printer controllers 8a, b, c are each capable of executing multiple instances of printer daemons PD1, PD2, PD3. Each printer daemon (PD) can transform an input data file to a format that may be processed by the printer. For instance, if the print job was a PostScript file, then the printer daemon (PD) would transform the PostScript file to a RIP image file. The IBM PS2AFP daemon program performs such a transformation. The printer daemons (PD) executing in multiple printer controllers 8a, b, c may be capable of simultaneously transforming different types of input data streams, e.g., PostScript, ditroff, PCL™, TeX, etc. PCL is a trademark of the Hewlett-Packard Company. The printer daemons in the controllers 8a, b, c then transfer the processed data file to one of several printers 12a, b, c, d through a back-end program that selects the printer. The printers 12a, b, c, d may be any suitable printer machine known in the art, such as the IBM INFOPRINT™ series of printers. INFOPRINT is a trademark of IBM.

A network system 14 links the clients 4a, b, c to the printer manager 6 and storage device 10, the printer manager 6 to the printer controllers 8a, b, c, and the printer controllers 8a, b, c, to the printers 12a, b, c, d. The network 14 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the clients 4a, b, c, and the printer manager 6, and the printer controllers 8a, b, c and the printers 12a, b, c, d. In preferred embodiments, the network printing system 2 employs a distributed file system (DFS), which allows storage and retrieval of data throughout the network printing system 2.

The printer manager 6 may be a separate stand alone server including an operating system such as AIX®, OS/390™, UNIX®, OS/2®, MVS™, WINDOWS®, etc. AIX and OS/2 are registered trademarks of IBM and OS/390 and MVS are trademarks of IBM; WINDOWS is a registered trademark of Microsoft Corporation; UNIX is a registered trademark licensed by the X/Open Company LTD. The clients 4a, b, c may be any computer system known in the art including software to submit print jobs to the printer manager 6. The storage device 10 may be any suitable nonvolatile storage device, such as a direct access storage device (DASD), automated tape library (ATL), holographic units, etc., capable of storing print files. The clients 4a, b, c may build print jobs that include print files, such as PostScript files, maintained in the storage device 10. The printer controllers 8a, b, c may be printer controllers capable of executing multiple instances of printer daemons, such as the IBM Multiple Printer Controllers (MPC) software that runs on the IBM RS/6000® server under the AIX operating system. RS/6000 is a registered trademark of IBM. The MPC software dedicates a portion of the server processor cycles to each instance of a printer daemon that transforms data to a print image. A RIP is often considered as the transform process of a PostScript file to a bit map file. The term RIP is used herein interchangeably with transform process and printer daemon (PD) to refer to any type of transform process regardless of the format of the file being transformed to a printer readable format, e.g., bitmap file. The terms RIP, RIPper, RIPped, and RIPping all refer to a particular stage or instance of a RIP transform process. As used herein the term "print job" refers to a print job that needs to be RIPped or otherwise transformed. The concurrent execution of multiple print daemons is embodied in current IBM MPC and IBM PSF/6000 software products, described in IBM publications "PSF/6000: Print Submission," document no. S544-3878-01 (Copyright IBM Corp. 1993, 1994); "PSF/6000: Print Administration," document no. S544-3817-01 (Copyright IBM Corp. 1993, 1994); "IBM Print OnDemand User Guide," document no. G544-5325-00, (Copyright IBM Corp. 1996), all of which IBM publications are incorporated herein by reference in their entirety. The printer manager 6 and printer controllers 8a, b, c would include further logic to implement the preferred embodiments of the present invention.

Each of the devices in the network 2 has a unique IP address. Moreover, each printer daemon (PD) in the printer controllers 8a, b, c may be associated with a port address. The combination of the IP address of the printer controller 8a, b, c and the port address therein provides a unique address for the printer daemon (PD). The printer manager 6 may use this unique printer daemon (PD) address to route a print job to a specific instance of one of many printer daemons executing in the printer controllers 8a, b, c.

Rule Based Selection Criteria

Related patent application entitled "Load Balancing For Processing A Queue Of Print Jobs," having U.S. application Ser. No. 09/140,480;, which application was incorporated herein by reference above, describes how the printer manager 6 selects a printer daemon (PD) in one of the printer controllers 8a, b, c to RIP a print job. After the print job is RIPped, the printer manager 6 maintains a queue and selects a RIPped job from the queue to then transfer to a printer in the printing system 2. Related patent application "Multiple Insertion Point Queue to Order and Select Tasks to be Processed," having U.S. Pat. No. 5,145,0301, which application was incorporated herein by reference above, describes a queue which may be used to select RIPped print jobs. The printer manager 6 maintains the queue across all printers 12a, b, c, d and printer controllers 8a, b, c regardless of where the RIPped print job resides. In preferred embodiments, the queue the printer manager 6 maintains may not include the actual RIPped files. Instead, the queue may maintain pointers to the RIPped files or a token representing the RIPped files that are part of the print job, whether those RIPped files are in one of the printer controllers 8a, b, c or in a library of RIPped files in the storage device 10.

Figure 2A:
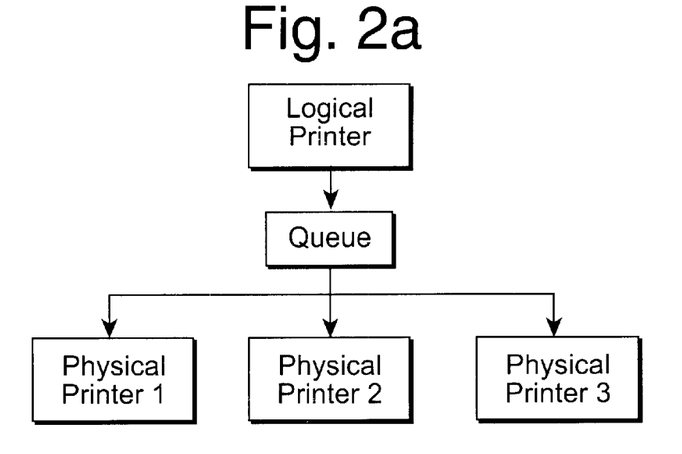
FIGS. 2a, b, c illustrate alternative arrangements for a queue that queues print jobs from one or more logical printers being sent to one or more physical printers.
Figure 2B:
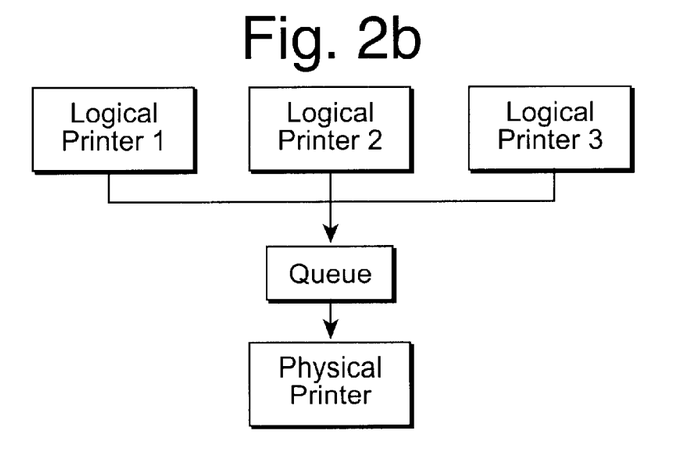
Figure 2C:
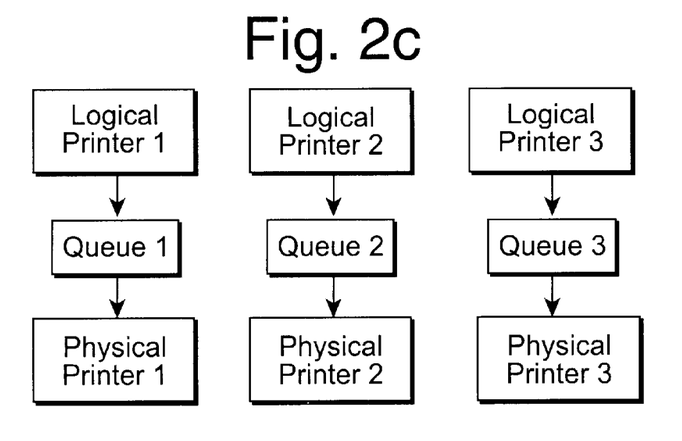

After selecting a print job from the queue, the printer manager 6 then determines those logical printers that are capable of printing the RIPped files of the print job. A logical printer is used to relate a queue to one or more printers. A logical printer groups physical printers that share a common set of print attributes and can print jobs having such common set of print attributes in a consistent manner. Typically, logical printers are associated with a single queue that spools the RIPped print jobs to one of the physical printers associated with the logical printer. FIGS. 2a, b, c illustrate different configurations of how a logical printer relates to one or more queues which in turn feed print jobs to one or more physical printers 12a, b, c, d. In FIG. 2a, a single queue routes RIPped print jobs from a single logical printer queue to one of many physical printers. In FIG. 2b, a single queue routes RIPped print jobs from multiple logical printers to a single physical printer in a funnel configuration. FIG. 2c illustrates an hourglass configuration of a many to many relationship of logical printers to queues to physical printers. In preferred embodiments, logical printer queues are implemented in the printer controllers 8a, b, c. Multiple logical printer queues may be implemented in a single printer controller 8a, b, c.

Preferred embodiments provide a rule-based criteria for selecting from multiple logical printers that are available to print the RIPped print job. The rule based criteria is applied to the entire collection of logical printers and attached printers as a single pool such that the rule based criteria controls the operation and coordination of multiple printers. Upon selecting a logical printer, the printer manager 6 then routes the RIPped print job, the token representing the print job or pointer to the print job to the queue for that logical printer. The queue to which the RIPped print job is routed may be within the printer controller 8a, b, c that RIPped the print job or on another printer controller 8a, b, c or storage device 10 in the system 2. The printer manager 6 must route any files of the RIPped print job that are not located in the printer controller 8a, b, c including the queue to the printer controller 8a, b, c maintaining the logical printer queue. In further embodiments, the queue from which the RIPped print job is selected to match with a logical printer may be within a single controller. In such case, the rule based criteria is used to select a logical printer within a printer controller 8a, b, c, and not across printer controllers 8a, b, c.

Examples of rule based criteria include attribute suitability, queue depth, reuse, and a tie-breaker. Initially, a selection of logical printers must be made based on attribute compatibility to select a printer having suitable pre and post process capabilities, e.g., color, duplex, forms, etc. Application of this rule may then return a set of available logical printers that can process the print job.

The next criteria may be a "queue depth rule" which considers the activity in the queue associated with the set of logical printers. This rule may consider the number of jobs in the queue, the byte size total of all jobs in the queue, the number of pages of all jobs, etc. In preferred embodiments, the queue depth may also include jobs that will soon be routed to the queue, i.e., a look-ahead capability. For instance, in many systems, in a multi-component print job, if a printer is already designated to handle one of the component print jobs, then the other component print jobs will be routed to that printer. The look-ahead capability factors into the queue depth the number of component print jobs, according to size, number of pages, bytes, etc., of print jobs that will be routed to the queue. The queue depth rule may be applied to further narrow the set of available logical printers by considering only printers having a certain queue depth. The queue depth rule maximizes the load balancing of the print workload because the queue depth rule selects those logical printers whose printers 12a, b, c, d have low use.

Another rule is the "reuse" rule which gives preference to a logical printer that is located in a printer controller 8a, b, c that has the greatest portion of RIP files for that print job of all the printer controllers 8a, b, c. For instance, in a print job of a multi-volume book, such as an encyclopedia, comprised of RIP files A–G, printer controller 8a may have RIP files A–C, printer controller 8b may have RIP files D, E, and printer controller 8c may have no RIP files for the print job. If all printer controllers include logical printer queues capable of handling the print job, then the "reuse" rule criteria would select the logical queue in printer controller 8a as printer controller 8a has the greatest portion of that print job. For a print job comprised of a single RIP file, the "reuse" rule would select a queue in a printer controller 8a, b, c having the single RIP file. Note that in a multiple printer controller 8a, b, c, environment, the "reuse" rule would favor selection of a logical printer having a queue in the printer controller 8a, b, c that includes the printer daemon (PD) that RIPped the print job as such printer controller 8a, b, c already has the RIPped file. The "reuse" rule minimizes network traffic by minimizing the need to transfer RIPped files from a common repository, e.g., storage device 10, that are already available in a printer controller 8a, b, c or to transfer RIPped files between printer controllers 8a, b, c. Although the "reuse" rule reduces network traffic, the reuse rule does not address load balancing. Application of the reuse rule alone can overload a single printer with print jobs while leaving other printers underutilized. Thus, a selection system which incorporates multiple criteria allows for optimization on more than one factor.

A yet further rule is a tie-breaker rule. If, for example, the application of the above two rules does not produce a single logical printer, then a tie breaker rule may be applied, i.e., by selecting the first logical printer, round robin selection or randomly selecting a logical printer from the remaining list of candidates.

The above criteria, or other criteria, can be applied in any particular order. For instance, if the order of application of the criteria is queue depth, reuse, and then tie breaker, then load balancing would be optimized and reduction in network traffic would be a secondary goal. On the other hand, if the order of application of the criteria was reuse, queue depth, and tie breaker, then network traffic would be minimized and load balancing would be secondary. In preferred embodiments, a systems operator or user may selectively alter the criteria applied and the order in which the criteria are applied to select the appropriate optimization approach. The criteria may be applied to determine those logical printers having the maximum reuse or minimum queue depth. Alternatively, the criteria may be applied to those printers falling within a predefined range, e.g., a queue depth less than 1,000 pages, a reuse greater than 1,000 pages. In preferred embodiments, the application of the criteria would never return zero logical printers; at least one logical printer must be returned from the application of the criteria.

Applying the preferred rule-based criteria results in an adaptive system which manages and coordinates all available printers as a single functional unit. The system adapts over time to changes in the printing environment, such as changes in the workload or capabilities of any printer. For example, the same job may be routed to different printers on different occasions because at a particular instance the workload at the printers varies, thus altering the selection of a printer based on the rule criteria. The rules thus allow the system to change or adapt to the printing environment.

Figure 3:
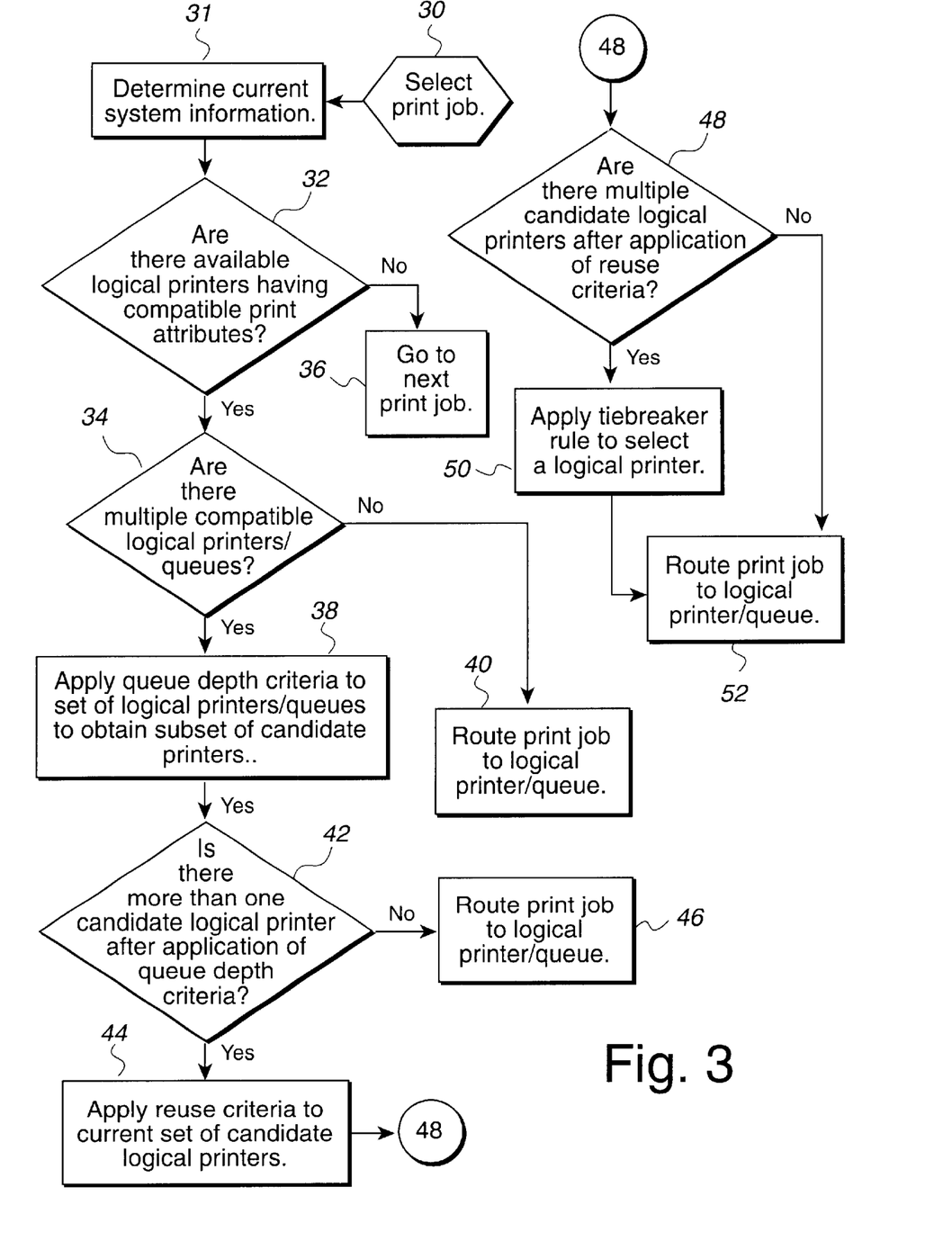
FIG. 3 illustrates logic to select logical printer queues using a rule-based criteria in accordance with preferred embodiments of the present invention.

FIG. 3 illustrates logic implemented in the printer manager 6 or the printer controllers 8a, b, c to select a queue for a physical printer 12, a, b, c, d, e.g., a logical printer, from multiple available logical printers/queues. Control begins at block 30 which represents the printer manager 6 selecting a print job, e.g., a RIPped print job, to route to a logical printer. As discussed the selected print job may not include the actual RIPped print files; instead the selected print job would include pointers that address the RIPped print files throughout the system 2. Control transfers to block 31 which represents the printer manager 6 querying the printers 12a, b, c, d in the system 2 to determine the status of the printers, including the queue depth, reuse capability, etc.

Control transfers to block 32 which represents the printer manager 6 determining whether there are available logical printers that are capable of handling the print job, e.g., include the appropriate paper, duplexing, color, etc. If so, control transfers to block 34; otherwise, if there are no logical printers associated with physical printers 12a, b, c, d that are capable of handling the printer job, then control transfers to block 36 which represents the printer manager 6 proceeding to the next print job. In preferred embodiments, if a print job is skipped, then the skipped print job will be routed to a printer in a subsequent iteration of the rule-based criteria that locates a suitable candidate printer to process the print job.

Block 34 represents the printer manager 6 determining whether there are multiple compatible logical printers. If so, control transfers to block 38; otherwise, control transfers to block 40 to route the RIPped print job to the only available logical printer queue that is associated with physical printer (s) 12a, b, c, d capable of printing the print job. Block 38 represents the printer manager 6 applying the queue depth criteria to the set of available logical printers to obtain a subset of candidate logical printers. This criteria may return the logical printer(s) associated with the minimum depth queue, where depth may be determined according to byte size of print jobs in queue, number of print jobs in the queue, pages, etc. Alternatively, the queue depth criteria may return logical printers associated with a queue below a certain minimum queue size. After applying the queue depth criteria, control transfers to block 42 which represents the printer manager 6 determining whether more than one of the candidate logical printers satisfies the minimum queue depth requirement. If so, control transfers to block 44; otherwise, control transfers to block 46 to route the print job to the single logical printer that satisfies the minimum queue depth criterion.

Block 44 represents the printer manager 6 applying the reuse criterion to the candidate logical printers resulting from step 38 to obtain a further subset of candidate logical printers. Control then transfers to block 48 which represents the printer manager 6 determining whether more than one of the subset of candidate logical printers satisfies the application of the reuse criterion after the queue depth criterion. If so, control transfers to block 50; otherwise, control transfers to block 52 to route the print job to the single logical printer remaining after application of the reuse criterion. Block 50 represents the printer manager 6 applying a tie breaker rule to select one from the remaining candidate logical printers and then routing the print job to the logical printer queue selected.

CONCLUSION

This concludes the description of the preferred embodiments of the invention. The following describes some alternative embodiments for accomplishing the present invention.

In preferred embodiments, there were three applied criteria, queue depth, reuse, and tie breaker. In alternative embodiments, alternative criteria may be applied. Further, the system operator may selectively apply the criteria in any desired order, depending upon which factor the operator wants to optimize, e.g., load balancing, minimizing network traffic, etc.

In preferred embodiments, the print queue includes tokens representing a print job or pointers to the print job. In this way, the pointers or tokens are routed to a selected candidate printer. Once a destination printer is selected, the actual print job content, e.g., a RIPped file, is then routed to the printer for printing.

Moreover, preferred embodiments provide an intelligent, adaptive routing system that determines routing based on the printing system status, including current workload and capabilities of printers in the network printing system. The rule based criteria alters the selection of a printer for a printer job based on the current characteristics of the system. For instance, a selection criteria that optimizes reuse may select a different printer for the same print job, depending on how components of the print job are distributed to printers in the system.

The printer manager 6 and printer controllers 8a, b, c are described as implemented in separate server machines networked together. In alternative embodiments, functions performed by the printer manager 6 may be implemented within one or more printer controllers 8a, b, c. Moreover, each printer controller 8a, b, c, may be capable of implementing more or fewer print daemons than the three print daemons illustrated in the preferred embodiment. In yet further embodiments, the printer manager 6 and printer controllers 8a, b, c may be implemented as software programs within a single server or within the printer unit.

In preferred embodiments, either the printer manager 6 or printer controllers 8a, b, c could apply the rule based criteria to select a logical printer/queue for a print job. The printer manager 6 could select a logical printer/queue across all available printer controllers 8a, b, c, regardless of where the print job content, i.e., RIPped components, is located. If the selected logical printer queue is in a printer controller 8a, b, c that does not maintain the RIPped print job, then the RIPped print job would be routed to the printer controller 8a, b, c including the selected logical printer queue. Alternatively, each printer controller 8a, b, c may use the rule based criteria to select a logical printer queue within a printer controller 8a, b, c for the print job.

In yet further embodiments, the rule based criteria could be applied in a single server including a plurality of queues, wherein each queue routes RIPped print jobs to one or more printers. In such case, the server would apply the rule based criteria to select from one of the many queues.

The logic of FIG. 3 is for illustrative purposes. Additional or alternative steps may be performed in addition to those illustrated in the logic. Further, the order of the steps in the preferred logic may also vary.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In summary, preferred embodiments in accordance with the present invention disclose a system for routing print jobs to one of a plurality of printers. After providing a print job, a set of printers capable of printing the print job is determined. The set of printers is queried to determine status information thereon. A criterion is then applied to the status information for the set of printers to determine a subset of printers. The determined subset is dependent upon the determined status information. A printer is selected from the subset and the print job is routed to the selected printer.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for routing print jobs to one of a plurality of printers, comprising the steps of:

providing a print job having attributes defining how the print job will be printed;

determining a set of print queues associated with at least one printer capable of printing the print job according to the print job attributes, wherein each print queue defines at least one associated printer;

querying the set of print queues to determine status information concerning processing of print jobs at printers associated with the set of determined print queues;

applying a criterion to the status information for the set of determined print queues to determine a subset of print queues, wherein the determined subset is dependent upon the determined status information;

selecting a print queue from the determined subset of print queues; and routing the print job to one printer associated with the selected print queue.

2. The method of claim 1, wherein the determined subset includes at least one printer.

3. The method of claim 1, wherein the print jobs maintained in the queue are comprised of pointers to print job content.

4. The method of claim 1, wherein the step of applying the criterion comprises determining at least one print queue in the set of print queues that satisfies a queue depth criterion related to print job activity in the queue.

5. The method of claim 4, wherein the queue depth criterion determines the print queues in the set having a minimum queue depth.

6. The method of claim 1, wherein the subset of print queues is a first subset, further comprising the step of applying a second criterion to the first subset of print queues when the first subset of print queues includes a plurality of print queues to determine a second subset of print queues, wherein the step of selecting a print queue comprises selecting a print queue from the second subset.

7. The method of claim 6, wherein prior to applying the first and second criteria, performing the step of selecting the first and second criteria from a set of at least two criteria.

8. A method for routing print jobs to one of a plurality of printers, comprising:

providing a print job having attributes defining how the print job will be printed, wherein the print job is comprised of pointers to at least one component print file;

determining a set of printers capable of printing the print job according to the print job attributes by determining a set of print queues, wherein each print queue defines at least one associated printer;

querying the set of print queues to determine status information concerning the processing or print jobs in the printers associated with the queues in the set;

applying a first criterion to the status information for the print queues to determine a first subset of print queues, wherein the determined first subset is dependent upon the determined status information, and wherein the print queues in the first subset are located in one of at least two printer controllers, wherein a network provides communication between the printer controllers;

applying a second criterion to the first subset of print queues when the first subset of print queues includes a plurality of print queues to determine a second subset of print queues by determining at least one print queue in the first subset located in a printer controller having a copy of at least one component print file of the print job;

selecting a print queue from the second subset; and routing the print job to the selected print queue, wherein the print queue routes the print job to a printer associated with the print queue.

9. The method of claim 8, wherein the step of applying the second criterion further comprises determining at least one print queue that is located in a printer controller having a maximum of component print files for the print job.

10. A method for routing print jobs to one of a plurality of printers, comprising:

providing a print job having attributes defining how the print job will be printed, wherein the print job includes pointers to component printer files, wherein at least one component print file is located in a first printer controller and the selected print queue is in a second printer controller, wherein a network provides communication between the printer controllers, determining a set of printers capable of printing the print job according to the print job attributes by determining a set of print queues, wherein each print queue defines at least one associated printer;

querying the set of print queues to determine status information concerning the processing of print jobs in the printers associated with the queues in the set;

applying a criterion to the status information for the print queues to determine a subset of print queues, wherein the determined subset is dependent upon the determined status information;

selecting a print queue of associated printers from the determined subset; and routing a component print file of the print job to a print queue by routing the component print file from the first printer controller to the second printer controller including the selected print queue via the network, wherein the print queue routes the component print file to one printer associated with the print queue.

11. A system for routing print jobs to one of a plurality of printers, comprising:

a plurality of printers;

a plurality of print queues, wherein each print queue defines at least one associated printer;

a server in communication with the plurality of print queues;

program logic executed by the server, comprising:
 (i) means for selecting a print job having attributes defining how the print job will be printed;
 (ii) means for determining a set of print queues associated with at least one printer capable of printing the print job according to the print job attributes;
 (iii) leans for querying the set of determined print queues to determine status information concerning processing of print jobs at the determined set of print queues;
 (iv) means for applying a criterion to the status information for the determined set of print queues to determine a subset of print queues, wherein the determined subset is dependent upon the determined status information;
 (v) means for selecting a print queue from the subset; and
 (vi) means for routing the print job to one printer associated with the selected print queue.

12. The system of claim 11, wherein the means for applying the criterion comprises determining at least one print queue in the set of print queues that satisfies a queue depth criterion related to print job activity in the queue.

13. The system of claim 12, wherein the queue depth criterion determines the print queues in the set having a minimum queue depth.

14. The system of claim 11, wherein the subset of print queues is a first subset, wherein the program logic executed by the server further comprises means for applying a second criterion to the fit subset of print queues when the first subset of print queues includes a plurality of print queues to determine a second subset of print queues, wherein the means for selecting a print queue comprises selecting a print queue from the second subset.

15. A system for routing print jobs to one of a plurality of printers wherein a print job is comprised of at least one pointer to at least one component print file, comprising:

a plurality of printers, wherein printers are associated with print queues, and where each print queue defines at least one associated printer;

a server in communication with the plurality of printers;

a plurality of printer controllers;

a network providing communication among the printer controllers and the printers; and program logic executed by the server, comprising:
 (i) means for selecting a print job having attributes defining how the print job will be printed;
 (ii) means for determining a set of print queues including printers capable of printing the print job according to the print job attributes;
 (iii) means for querying the set of print queues to determine status information concerning the processing of print jobs in the printers associated with the queues in the set;
 (iv) means for applying a first criterion to the status information for the print queues to determine a first subset of print queues, wherein the determined subset is dependent upon the determined status information, and wherein the print queues in the first subset are located in at least one of the printer controllers;
 (v) means for applying a second criterion to the first subset of print queues when the first subset of print queues includes a plurality of print queues to determine at least one print queue in the first subset located in a printer controller having a copy of at least one component print file of the print job;
 (v) means for selecting one print queue from the second subset; and
 (vi) means for routing the print job to the selected print queue, wherein the print queue routes the print job to a printer associated with the print queue.

16. The system of claim 15, wherein the means for applying the second criterion determines at least one print queue that is located in a printer controller having a maximum of component print files for the print job.

17. A system for routing print jobs to one of a plurality of printers wherein the print job includes pointers to component printer files, comprising:

a plurality of printers, wherein printers are associated with print queues, and where each print queue defines at least one associated printer;

a server in communication with the plurality of printers;
a plurality of printer controllers;
a network providing communication among the printer controllers and the printers; and program logic executed by the server, comprising:
- (i) means for selecting a print job having attributes defining how the print job will be printed;
- (ii) means for determining a set of print queues including printers capable of printing the print job according to the print job attributes;
- (iii) means for querying the set of print queues to determine status information concerning the processing of print jobs in the printers associated with the queues in the set;
- (iv) means for applying a criterion to the status information for the print queues to determine a subset of print queues, wherein the determined subset is dependent upon the determined status information;
- (v) means for selecting one print queue from the subset, wherein at least one component print file is located in a first printer controller and the selected print queue is located in a second printer controller;
- (vi) means for routing a component print file of the print job to a print queue by routing the component print file from the first printer controller to the second printer controller including the selected print queue via the network.

18. An article of manufacture for use in programming a computer to route print jobs to printers, the article of manufacture comprising computer readable storage media including at least one computer program embedded therein that causes the computer to perform the steps of:
providing a print job having attributes defining how the print job will be printed;
determining a set of print queues associated with at least one printer capable of printing the print job according to the print job attributes, wherein each print queue defines at least one associated printer;
querying the set of print queues to determine status information concerning the processing of print jobs at the set of print queues;
applying a criterion to the status information for the set of print queues to determine a subset of print queues, wherein the determined subset is dependent upon the determined status information;
selecting a print queue from the subset; and
routing the print job to one printer associated with the selected print queue.

19. The article of manufacture of claim 18, wherein the determined subset includes at least one printer.

20. The article of manufacture of claim 18, wherein the print jobs maintained in the queue are comprised of pointers to print job content.

21. The article of manufacture of claim 18, wherein the step of applying the criterion comprises determining at least one print queue in the set of print queues that satisfies a queue depth criterion related to print job activity in the queue.

22. The article of manufacture of claim 21, wherein the queue depth criterion determines the print queues in the set having a minimum queue depth.

23. The article of manufacture of claim 18, wherein the subset of print queues is a first subset, further comprising the step of applying a second criterion to the first subset of print queues when the first subset of print queues includes a plurality of print queues to determine a second subset of print queues, wherein the step of selecting a print queue comprises selecting a print queue from the second subset.

24. The article of manufacture of claim 23, wherein prior to applying the first and second criteria, performing the step of selecting the first and second criteria from a set of at least two criteria.

25. An article of manufacture for use in programming a computer to route print jobs to printers, the article of manufacture comprising computer readable storage media including at least one computer program embedded therein that causes the computer to perform the steps of:
providing a print job having attributes defining how the print job will be printed, wherein the print job is comprised of pointers to at least one component print file;
determining a set of printers capable of printing the print job according to the print job attributes by determining a set of print queues, wherein each print queue defines at least one associated printer;
querying the set of print queues to determine status information concerning the processing or print jobs in the printers associated with the queues in the set;
applying a first criterion to the status information for the print queues to determine a first subset of print queues, wherein the determined first subset is dependent upon the determined status information, and wherein the print queues in the first subset are located in one of at least two printer controllers, wherein a network provides communication between the printer controllers;
applying a second criterion to the first subset of print queues when the first subset of print queues includes a plurality of print queues to determine a second subset of print queues by determining at least one print queue in the first subset located in a printer controller having a copy of at least one component print file of the print job;
selecting a print queue from the second subset; and
routing the print job to the to the selected print queue, wherein the print queue routes the print job to a printer associated with the print queue.

26. The article of manufacture of claim 25, wherein the step of applying the second criterion further comprises determining at least one print queue that is located in a printer controller having a maximum of component print files for the print job.

27. An article of manufacture for use in programming a computer to route print jobs to printers, the article of manufacture comprising computer readable storage media including at least one computer program embedded therein that causes the computer to perform the steps of:
providing a print job having attributes defining how the print job will be printed, wherein the print job includes pointers to component printer files, wherein at least one component print file is located in a first printer controller and the selected print queue is in a second printer controller, wherein a network provides communication between the printer controllers,
determining a set of printers capable of printing the print job according to the print job attributes by determining a set of print queues, wherein each print queue defines at least one associated printer;
querying the set of print queues to determine status information concerning the processing of print jobs in the printers associated with the queues in the set;
applying a criterion to the status information for the print queues to determine a subset of print queues, wherein the determined subset is dependent upon the determined status information;

selecting a print queue of associated printers from the determined subset; and routing a component print file of the print job to a print queue by routing the component print file from the first printer controller to the second printer controller including the selected print queue via the network, wherein the print queue routes the component print file to one printer associated with the print queue.

* * * * *

UNITED STATES PATENT AND TRADEMARK OFFICE
CERTIFICATE OF CORRECTION

PATENT NO. : 6,498,656 B1
DATED : December 24, 2002
INVENTOR(S) : Scott D. Mastie and Ming Xie It is certified that error appears in the above-identified patent and that said Letters Patent is hereby corrected as shown below:

Column 3,
Line 24, after "goal." there should not be a new paragraph.

Column 11,
Line 27, delete "," and insert -- ; --
Line 63, delete "leans" and insert -- means --

Column 12,
Line 15, delete "fit" and insert -- first --

Column 14,
Line 24, after "," delete "and"
Line 26, after "," insert -- and --

Signed and Sealed this

Second Day of August, 2005

JON W. DUDAS
*Director of the United States Patent and Trademark Office*